(12) United States Patent
Ent et al.

(10) Patent No.: US 9,880,593 B2
(45) Date of Patent: Jan. 30, 2018

(54) SINGLE PIECE CARD RETAINER

(71) Applicant: Lenovo (Singapore) Pte. Ltd., Singapore (SG)

(72) Inventors: Ali Kathryn Ent, Raleigh, NC (US); Rodrigo Samper, Raleigh, NC (US); Shuang Li, Guangdong (CN); Chen Jianyang, Guangdong (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/087,117

(22) Filed: Mar. 31, 2016

(65) Prior Publication Data

US 2017/0285697 A1 Oct. 5, 2017

(51) Int. Cl.
*G06F 1/16* (2006.01)
*H05K 5/00* (2006.01)
*H05K 7/00* (2006.01)
*G06F 1/18* (2006.01)

(52) U.S. Cl.
CPC .............. *G06F 1/185* (2013.01); *G06F 1/181* (2013.01)

(58) Field of Classification Search
CPC ...... G06F 1/1656; G06F 1/1658; G06F 1/166; G06F 1/183; G06F 1/185; G06F 1/186

USPC ........................................ 361/679.32–679.39
See application file for complete search history.

(56) References Cited

U.S. PATENT DOCUMENTS

| | | | | |
|---|---|---|---|---|
| 6,442,038 B1 * | 8/2002 | Erickson | ................. | G06F 1/184 |
| | | | | 211/41.17 |
| 7,443,666 B2 * | 10/2008 | Huang | ..................... | G06F 1/184 |
| | | | | 312/223.1 |
| 8,218,308 B2 * | 7/2012 | Yang | ........................ | G06F 1/185 |
| | | | | 361/679.32 |
| 9,625,958 B2 * | 4/2017 | Junkins | ................... | G06F 1/185 |

\* cited by examiner

*Primary Examiner* — Anthony Haughton
(74) *Attorney, Agent, or Firm* — Ference & Associates LLC

(57) ABSTRACT

One embodiment provides an apparatus, including: a processor; a housing including a plurality of slots; and a single piece card retainer, comprising: a back surface; a front surface comprising a plurality of independent projections, wherein each of the plurality of independent projections is flexible and aligns with a slot of the plurality of slots; and at least two connection points that connect the single piece card retainer to the housing, where the single piece card retainer rotates about the at least two connection points to open and close with respect to the plurality of slots. Other embodiments are described and claimed.

20 Claims, 6 Drawing Sheets

SINGLE PIECE CARD RETAINER

BACKGROUND

Electronic components such as graphics cards, PCI express cards, etc. (herein "card(s)") are often provided within a card slot in a system (e.g., desktop computing system). A card is placed within the card slot and typically is moved within the card slot to mate with connectors, e.g., to attach to a circuit board. Card slots that are not in use typically have a card insert, which is a placeholder that covers the card slot.

Card retainers act to keep the card in place. The card is secured by the retainer by virtue of the retainer abutting the end of the card, e.g., distal to the end of the card that connects to the circuit board. The card retainer is designed to secure the cards within the card slots, yet permit the cards to be removed, e.g., by a reverse operation of card insertion.

BRIEF SUMMARY

In summary, one aspect provides an apparatus, comprising: a processor; a housing including a plurality of slots; and a single piece card retainer, comprising: a back surface; a front surface comprising a plurality of independent projections, wherein each of said plurality of independent projections is flexible and aligns with a slot of the plurality of slots; and at least two connection points that connect the single piece card retainer to the housing, wherein said single piece card retainer rotates about the at least two connection points to open and close with respect to the plurality of slots.

Another aspect provides an apparatus, comprising: a housing comprising a plurality of card slots; and a single piece card retainer, comprising: a back surface; a front surface comprising a plurality of independent projections, wherein each of said plurality of independent projections is flexible and aligns with a card slot of the plurality of card slots; and at least two connection points that connect the single piece card retainer to a housing, wherein said single piece card retainer rotates about the at least two connection points to open and close with respect to the plurality of card slots.

A further aspect provides an apparatus, comprising: a processor; a housing including a plurality of slots; a card operatively coupled to the processor and disposed within one of the plurality of slots; and a single piece card retainer, comprising: a back surface; a front surface comprising a plurality of independent projections, wherein each of said plurality of independent projections is flexible and aligns with a slot of the plurality of slots; and at least two connection points that connect the single piece card retainer to the housing, wherein said single piece card retainer rotates about the at least two connection points to open and close with respect to the plurality of slots.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The illustrated example embodiments will be best understood by reference to the figures. The following description is intended only by way of example, and simply illustrates certain example embodiments.

An embodiment provides a single piece card retainer. The single piece card retainer may be used, for example, to secure a plurality of removable graphics cards within slots of a system housing. For example, the single piece card retainer may be used in connection with a personal computing device such as a desktop computer.

Figure 1:
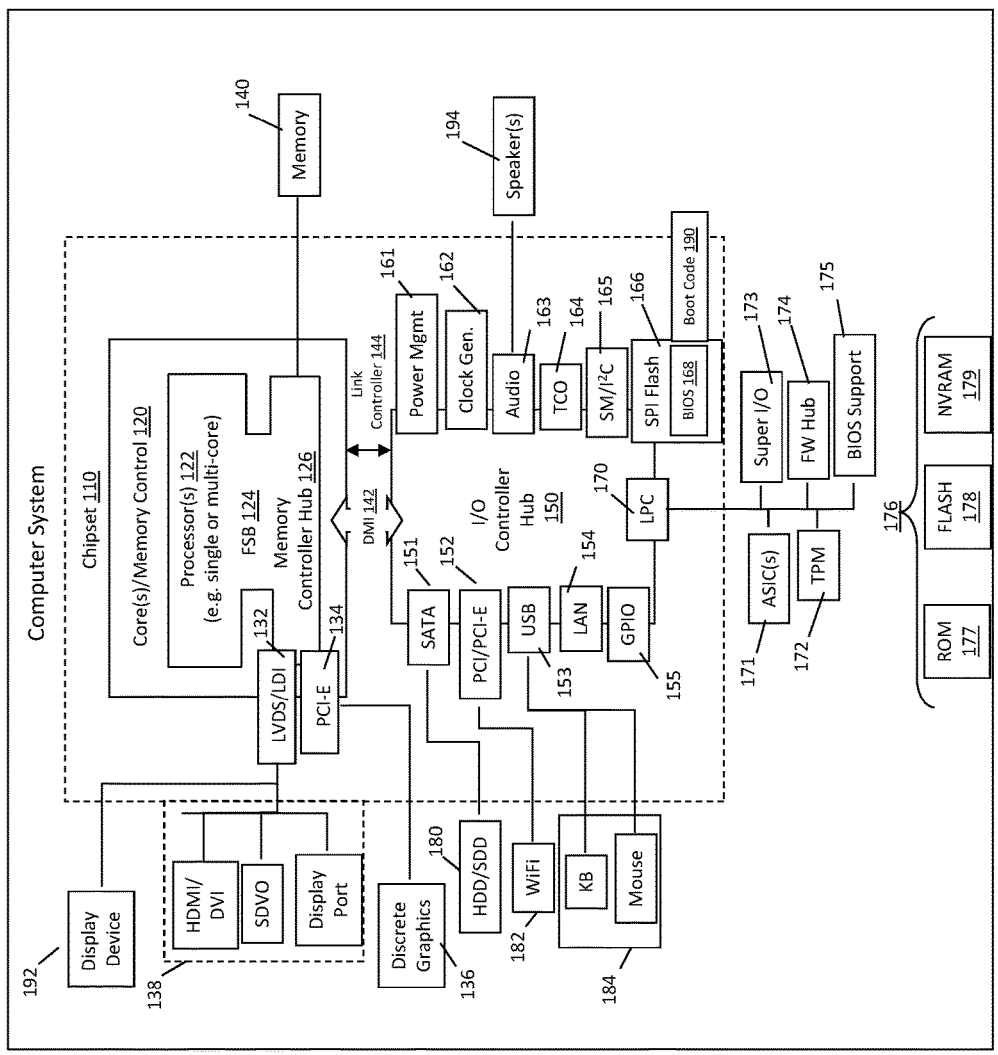
FIG. 1 illustrates an example of information handling device circuitry.

FIG. 1 depicts a block diagram of another example of device or system circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 180), a PCI-E interface 152 (for example, for wireless connections 182), a USB interface 153 (for example, for devices 184 such as a digitizer, keyboard, mice, cameras, phones, microphones, storage, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Device circuitry, as for example outlined in FIG. 1, may be used in devices such as desktop computers that include discrete graphics 136 in the form of removable cards. In an embodiment, as illustrated in FIG. 2, a single piece card retainer is provided that attaches to the housing of the system in a rotatable fashion.

Figure 2:
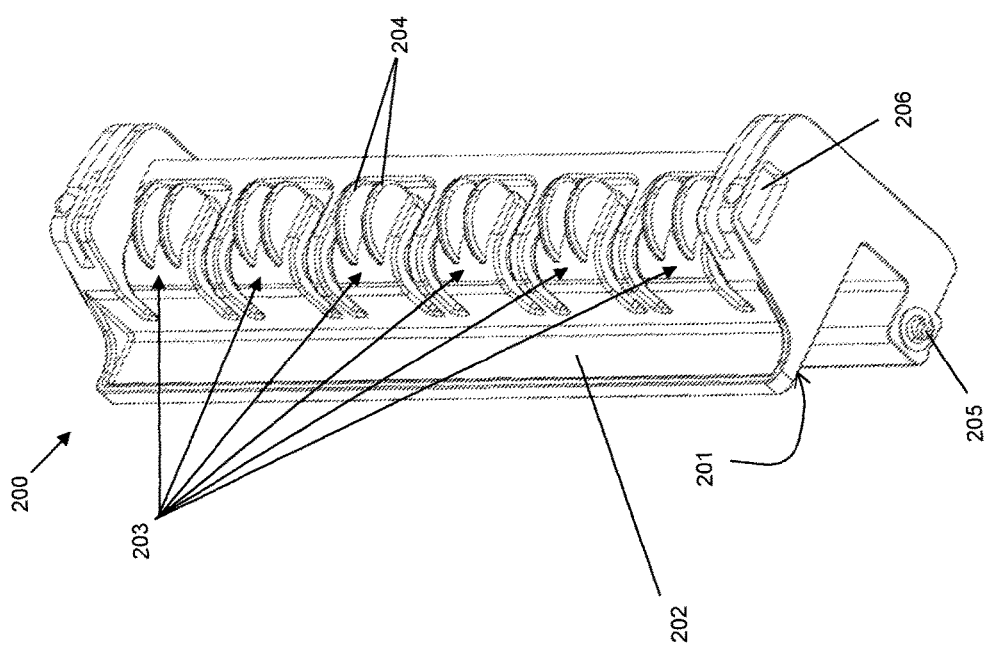
FIG. 2 illustrates an example single piece card retainer.

Specifically, as illustrated in the perspective view of FIG. 2, a single piece card retainer 200 includes a back surface 201 (obscured due to the view of FIG. 2) that is substantially opposite a front surface 202. The front surface 202 includes a plurality of independent projections (collectively indicated at 203). The independent projections 203 arise from a central portion of the single piece card retainer 200. The projections 203 are independent in that they are spaced projections, e.g., made of plastic or other polymer, that are flexible due to their material construction. Each independent projection 203 may include two or more sub projections for contacting a graphics card or card insert placed within a slot of a system housing, as further described herein.

FIG. 2 also illustrates that the single piece card retainer 200 attaches to a system housing in a rotatable fashion via a connection mechanism, e.g., projections for making a hinged attachment to the housing, such as indicated at 205. Further, the single piece card retainer may be secured in a closed position via an appropriate securing mechanism. In the example of FIG. 2, a detent 206 is provided that mates with a spring loaded (or otherwise biased) element in the housing (not illustrated in FIG. 2).

FIG. 3(A-D) illustrates an example of the single piece retainer card in context. Specifically, FIG. 3A illustrates the single piece retainer card of FIG. 2 attached to a system housing and in a closed position, i.e., securing cards (or card inserts) within slots of the system housing. FIG. 3B illustrates the single piece retainer card partially rotated out and disengaged from the securing mechanism of the housing. FIG. 3C illustrates further rotation of the single piece retainer card, revealing card slots behind the single piece card retainer. FIG. 3D illustrates the single piece card retainer fully rotated to an open position, e.g., for card insertion and/or removal.

Figure 3A:
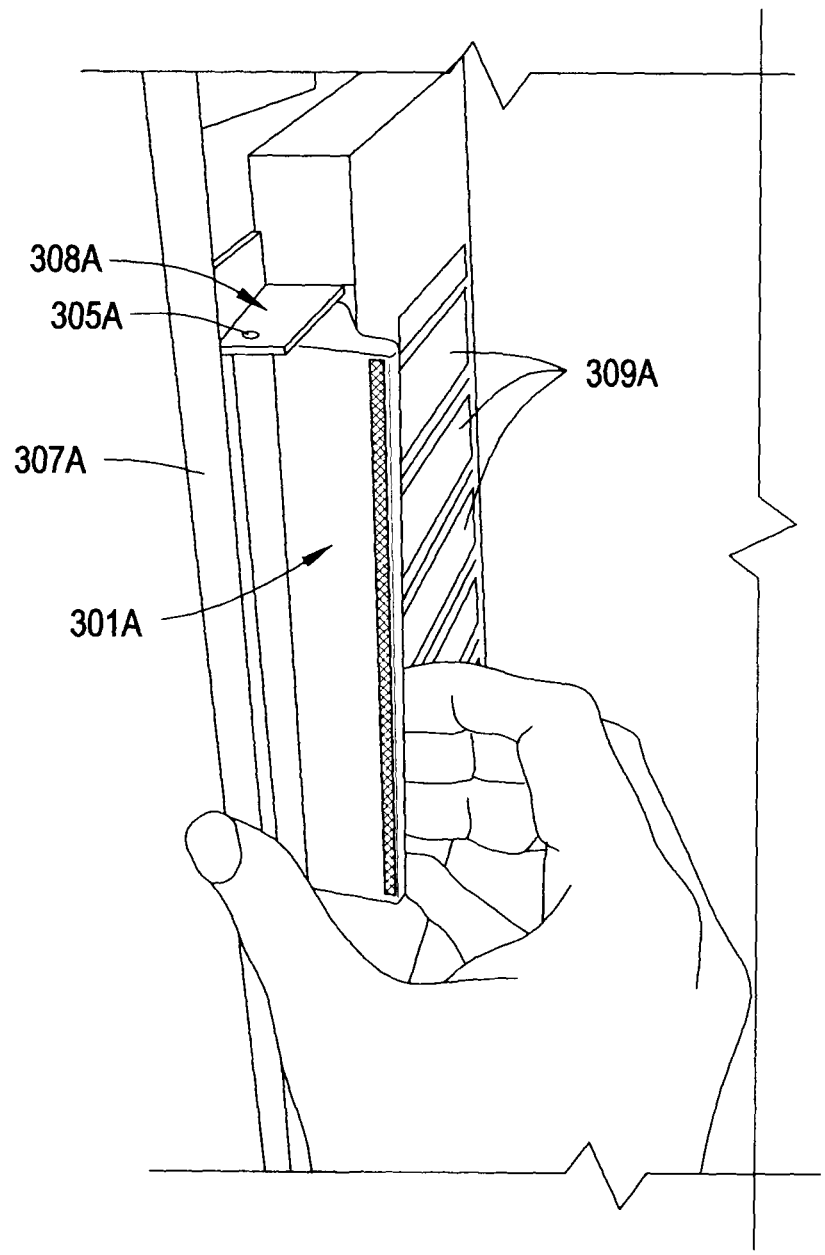
FIG. 3(A-D) illustrates the single piece card retainer of FIG. 2 transitioning between closed and open positions.

Turning specifically to FIG. 3A, the single piece card retainer is attached in a rotatable fashion to the housing 307a of the system (e.g., the metal lip of a system case) by projection 305a, which fits into an aperture provided by housing element 308a. A similar attachment or connection is provided in a lower portion, but this view is obscured by the operator's hand in FIG. 3A.

The back surface 301a faces outwardly, i.e., it is visible when the user removes the outer system casing, which in turn acts to secure the single piece card retainer in place by virtue of the inside face of the system case (not shown) abutting the back surface 301a of the single piece card retainer.

The card slots 309a (having card inserts therein) are visible behind the single piece card retainer. Four card slots 309a are specifically indicated for simplicity sake. The single piece retainer card will be rotated by the user to reveal the ends of the card slots 309a, from which cards may be inserted or removed.

Figure 3B:
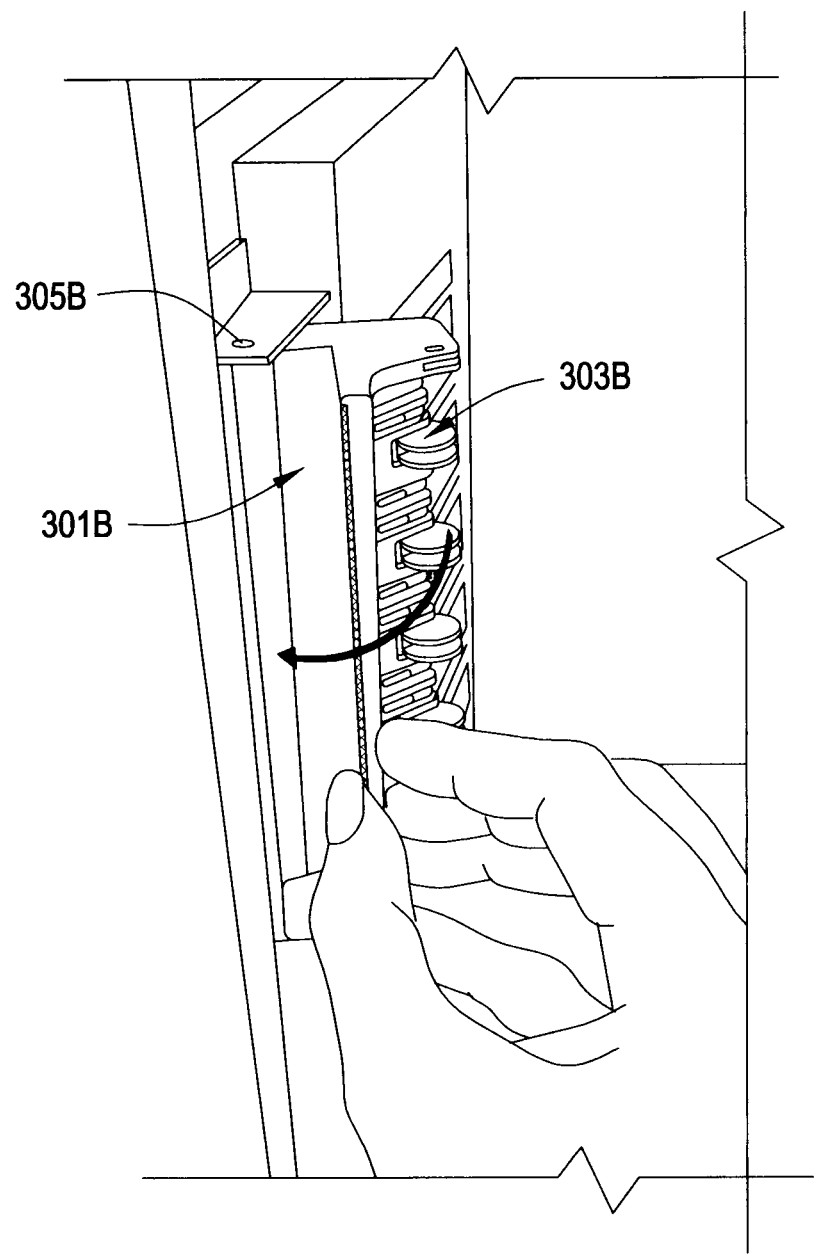

By way of illustrated example, FIG. 3B illustrates a user rotating the single piece card retainer outwardly about the pivot point, again afforded by the connection mechanism comprising the projection 305b. The back surface 301b of the single piece card retainer continues to rotate outwardly (toward the user) and the opposite, components of the front surface come into partial view, as indicated by the appearance of the independent projections, one of which is indicated at 303b. As will be appreciated from review of FIGS. 2, 3A and 3B, the independent projections will abut the ends of the cards or card inserts when the single piece retainer card is in a closed position (FIG. 3A).

Figure 3C:
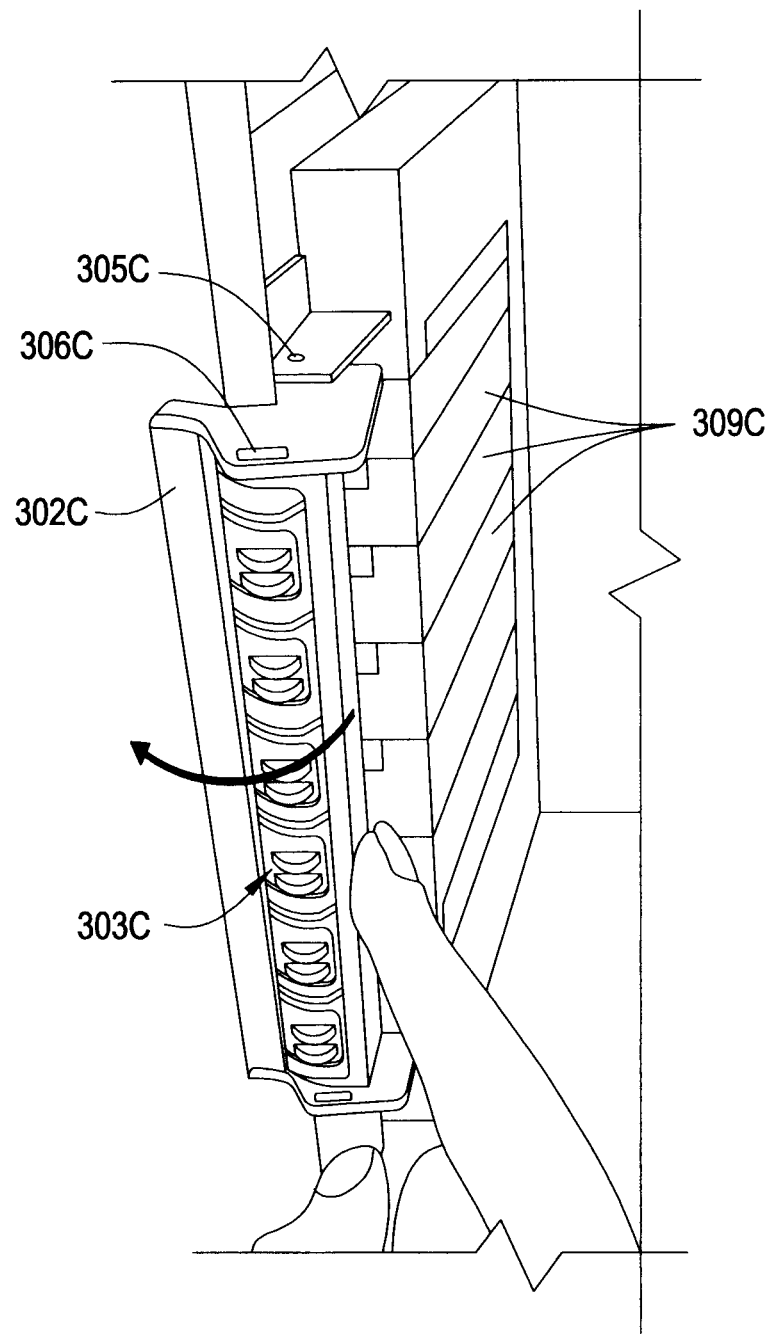

As the user rotates the single piece retainer card further, as shown in FIG. 3C, the ends of the card slots 309c become more visible. As shown, the front surface 302c comes into view, as do the independent projections, one of which is indicated at 303c. Also, the detent 306c comes into view, as it has been disengaged from the projection of the housing by the user's manual action of rotating the single piece retaining card about the hinge mechanism supplied by projection 305c and aperture of the housing element, as described herein.

Figure 3D:
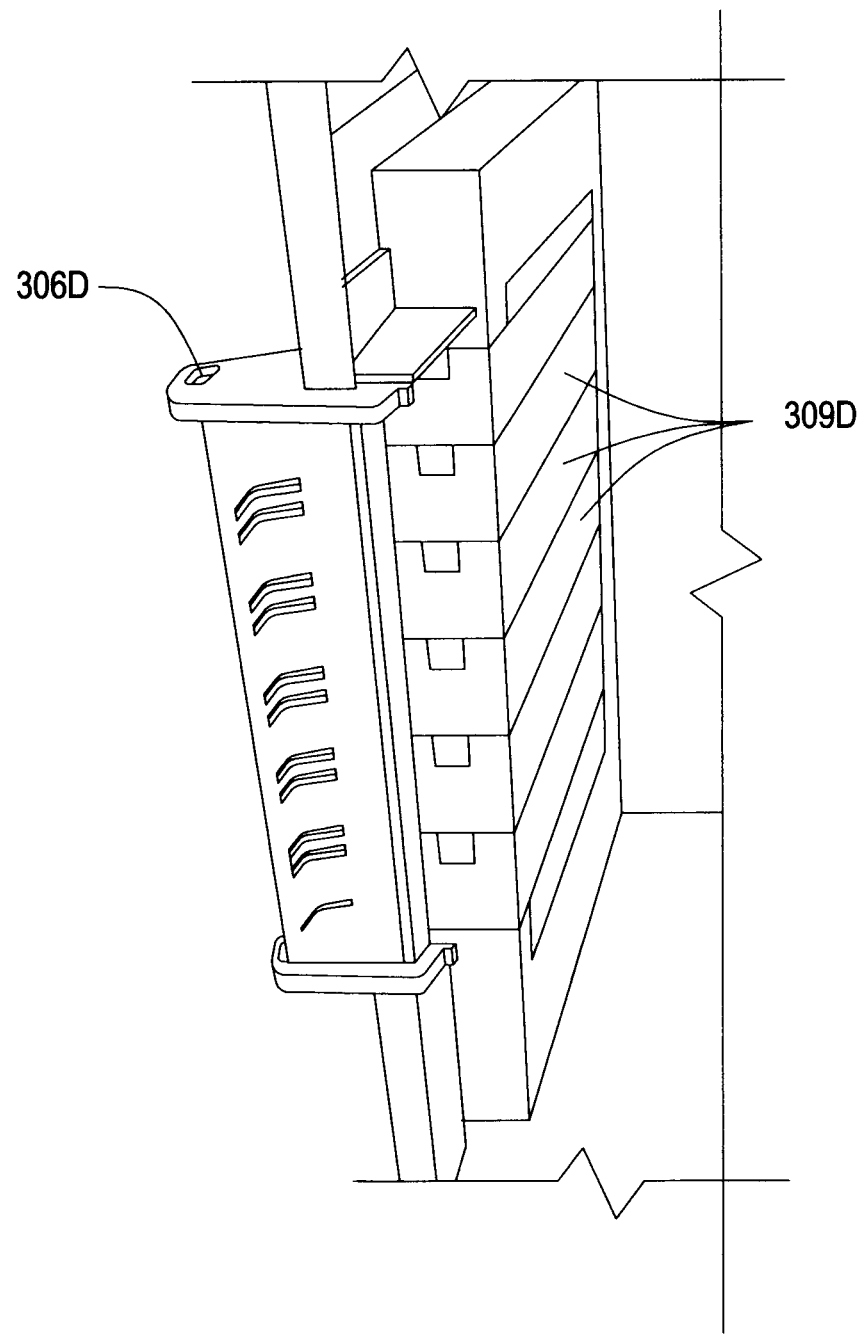

FIG. 3D illustrates the single piece card retainer fully open, i.e., giving clear access to the ends of the card slots 309d for card insertion and removal. Here, the detent 306d is clearly visible as well. The user may insert and or remove cards from the card slots 309d, and then reverse the rotation process to secure the cards within the card slots 309d. When the single piece card retainer is fully closed, as shown in FIG. 3A, the independent projections, by virtue of their shape, position and/or material construction, are biased against the ends of the elements (cards or card inserts) contained within the card slots 309d, ensuring that the element in properly seated.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   a processor;
   a housing including a plurality of slots; and
   a single piece card retainer, comprising:
      a back surface;
      a front surface comprising a plurality of independent projections, wherein each of said plurality of independent projections is flexible and aligns with a slot of the plurality of slots; and
      at least two connection points that connect the single piece card retainer to the housing, wherein said single piece card retainer rotates about the at least two connection points to open and secure the single piece card retainer with respect to the plurality of slots, wherein the single piece card retainer is secured using a detent.

2. The apparatus of claim 1, further comprising a card operatively coupled to the processor and disposed within one of the plurality of slots.

3. The apparatus of claim 1, wherein the single piece card retainer comprises a lateral surface having the detent therein.

4. The apparatus of claim 3, wherein the lateral surface comprises two lateral surfaces, said two lateral surfaces bookending the plurality of independent projections.

5. The apparatus of claim 4, wherein, in a first, closed position, said back surface of said single piece card retainer lies substantially flush with a lip of said housing.

6. The apparatus of claim 5, wherein the detent of the lateral surface accepts a projection of the housing in the first, closed position.

7. The apparatus of claim 4, wherein, in a first, closed position, said plurality of independent projections bias an element within said plurality of slots in a direction away from the back surface.

8. The apparatus of claim 7, wherein the element is selected from the group consisting of a card and a card insert.

9. The apparatus of claim 8, wherein the card is a graphics card.

10. An apparatus, comprising:
    a housing comprising a plurality of card slots; and
    a single piece card retainer, comprising:
       a back surface;
       a front surface comprising a plurality of independent projections, wherein each of said plurality of independent projections is flexible and aligns with a card slot of the plurality of card slots; and
       at least two connection points that connect the single piece card retainer to a housing, wherein said single piece card retainer rotates about the at least two connection points to open and secure the single piece card retainer with respect to the plurality of slots, wherein the single piece card retainer is secured using a detent.

11. The apparatus of claim 10, wherein the single piece card retainer comprises a lateral surface having the detent therein.

12. The apparatus of claim 11, wherein the lateral surface comprises two lateral surfaces, said two lateral surfaces bookending the plurality of independent projections.

13. The apparatus of claim 12, wherein, in a first, closed position, said back surface of said single piece card retainer lies flush with a lip of said housing.

14. The apparatus of claim 13, wherein the detent of the lateral surface accepts a projection of the housing in the first, closed position.

15. The apparatus of claim 10, wherein said single piece card retainer is plastic.

16. The apparatus of claim 15, wherein the plurality of independent projections are curved outwardly from a central portion of the single piece card retainer.

17. An apparatus, comprising:
    a processor;
    a housing including a plurality of slots;
    a card operatively coupled to the processor and disposed within one of the plurality of slots; and
    a single piece card retainer, comprising:
       a back surface;
       a front surface comprising a plurality of independent projections, wherein each of said plurality of independent projections is flexible and aligns with a slot of the plurality of slots; and
       at least two connection points that connect the single piece card retainer to the housing, wherein said single piece card retainer rotates about the at least two connection points to open secure the single piece card retainer with respect to the plurality of slots, wherein the single piece card retainer is secured using a detent.

18. The apparatus of claim 17, wherein said single piece card retainer is plastic.

19. The apparatus of claim 18, wherein the plurality of independent projections flex independently.

20. The apparatus of claim 17, wherein the card is a graphics card.

* * * * *